United States Patent [19]

Ariyoshi et al.

[11] Patent Number: 4,520,420
[45] Date of Patent: May 28, 1985

[54] CURRENT CONTROL METHOD AND APPARATUS FOR ELECTROMAGNETIC VALVES

[75] Inventors: Hiromi Ariyoshi; Iwao Yokomori, both of Kariya, Japan

[73] Assignee: Nippondenso Co., Ltd., Kariya, Japan

[21] Appl. No.: 556,779

[22] Filed: Dec. 1, 1983

[30] Foreign Application Priority Data

Dec. 1, 1982 [JP] Japan .................. 57-211848

[51] Int. Cl.³ ............................. H01H 47/32
[52] U.S. Cl. .................... 361/154; 123/490
[58] Field of Search ............. 361/152, 154; 123/490; 364/431.01, 431.05

[56] References Cited

U.S. PATENT DOCUMENTS 4,180,026 12/1979 Schülzke et al. ............... 123/32 EF
4,266,261 5/1981 Streit et al. .................... 361/154

Primary Examiner—Reinhard J. Eisenzopf
Attorney, Agent, or Firm—Cushman, Darby & Cushman

[57] ABSTRACT

For controlling a pulse-operated electromagnetic valve, an energization voltage is applied to the actuating coil of the valve in response to a leading edge of the pulse to initiate an energization current. When the current reaches a predetermined peak value the voltage is decoupled from the coil to allow a circulating current to flow through a first path to decrease it at a higher rate. The circulating current is switched to a second path when it reaches a medium current value to decrease it at a lower rate. When the decreasing circulating current reaches a lower holding current value which is necessary to hold the valve operated, the voltage is coupled again to the coil to reinitiate the energization current, and when it reaches a higher holding current value lower than the medium current value the voltage is decoupled to reinitiate the circulating current. The higher and lower holding current values are successively detected to energize the coil with a current which is an average value of the higher and lower current values.

10 Claims, 3 Drawing Figures

CURRENT CONTROL METHOD AND APPARATUS FOR ELECTROMAGNETIC VALVES

BACKGROUND OF THE INVENTION

The present invention relates to a method and a circuit arrangement for controlling the operating current of an electromagnetic valve in response to the application of a variable duration pulse. The invention is particularly suitable for electronic fuel injection.

A number of attempts have been made to improve the operating efficiency and response characteristics of pulse-operated electromagnetic valves such as vehicle's fuel injection valves. According to U.S. Pat. No. 4,180,026, the actuating coils of fuel injection valves are initially energized with a relatively large current to open the valve in quick response to the leading edge of an applied pulse. The current is reduced to a lower level necessary to hold the valve open during the remainder of the pulse duration for purposes of reducing the power consumption and allowing the valve to close in a short period of time in response to the trailing edge of the pulse. The aforesaid U.S. patent employs a switching transistor coupled in series with the actuating coils of the valves and an energy absorbing circuit coupled in parallel with the actuating coils. The switching transistor is turned on in response to the leading edge of an applied pulse and turned off when the current reaches a predetermined value. Upon the turn-off the transistor, a "flywheel" current is generated as a result of the "flywheel" effect of the actuating coils. The energy absorbing circuit allows the flywheel current to pass therethrough to absorb the energy stored in the actuating coils before the valve is switched to the hold mode. However, there is a substantial difference between the peak current value and the holding level and therefore a relatively long transition period elapses between the energization mode and the hold mode. If the valve control pulse terminates during the transition period, a substantial amount of energy still remains to be absorbed, causing the valve to take a relatively long time to return to the closed position.

SUMMARY OF THE INVENTION

Accordingly, it is an object of the invention to provide an improved valve control whereby the return response characteristic of an electromagnetic valve is less likely to be affected by the early termination of a variable duration input pulse.

The invention provides a method for controlling the operating current of an electromagnetic valve. The method comprises the steps of coupling an energization voltage to the actuating coil of an electromagnetic valve in response to a leading edge of a variable duration pulse to initiate an energization current in the coil, detecting when the energization current reaches a predetermined peak value to allow the valve to open in a short time, decoupling the energization voltage from the coil thereby allowing the current to circulate through a first path to decrease the circulating current at a higher rate, detecting when the circulating current decreases to a medium current value to switch the circulating current to a second path to decrease it at a lower rate, detecting when the circulating current reaches a lower holding current value sufficient to hold the electromagnetic valve operated, coupling the energization voltage again to the coil to reinitiate the energization current, detecting when the energization current reaches a higher holding current value which is lower than the medium current value, and decoupling the energization voltage again from the coil to reinitiate the circulating current. The higher and lower holding current values are successively detected so that the actuating coil is energized with a current of the magnitude which lies between the higher and lower holding values until the control pulse terminates.

The invention provides an apparatus which implements the method. In the apparatus a switching device is connected in series with the actuating coil of the valve for coupling an energization voltage thereto when rendered conductive to generate an energization current and decoupling the voltage therefrom when rendered nonconductive to generate a circulating current.

A first switching signal is generated when the energization current reaches a peak current value and a second switching signal is generated when the circulating current to a medium current value. A third switching signal is generated when the circulating current drops to a lower holding current value to reenergize the coil and a fourth switching signal is generated when the energization current rises to a higher holding current value lower than the medium current value to reinitiate the circulating current.

The switching device is rendered conductive in response to a leading edge of the valve control pulse and further in response to the third switching signal and rendered nonconductive in response to the first and fourth switching signals and further in response to a trailing edge of the valve control pulse. A first energy absorbing circuit is connected in parallel with the actuating coil for passing the circulating current generated in response to the switching device being rendered nonconductive. A second energy absorbing circuit is switched into parallel connection with the actuating coil for passing the circulating current in response to the second switching signal.

BRIEF DESCRIPTION OF THE DRAWINGS

The present invention will be described in further detail with reference to the accompanying drawings, in which.

DETAILED DESCRIPTION

Figure 1A:
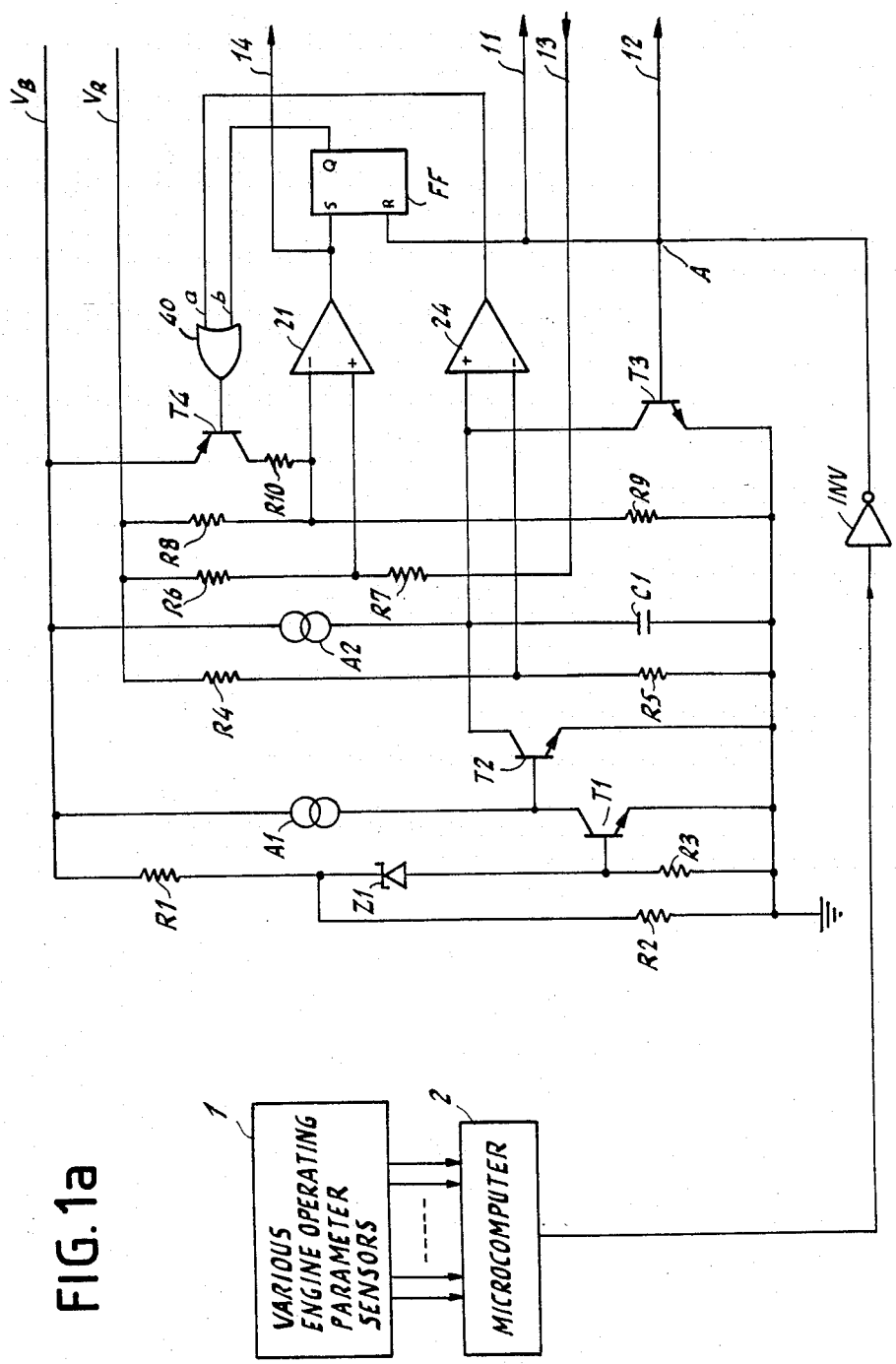
FIGS. 1a and 1b are a block diagram of the apparatus of the invention.
Figure 1B:
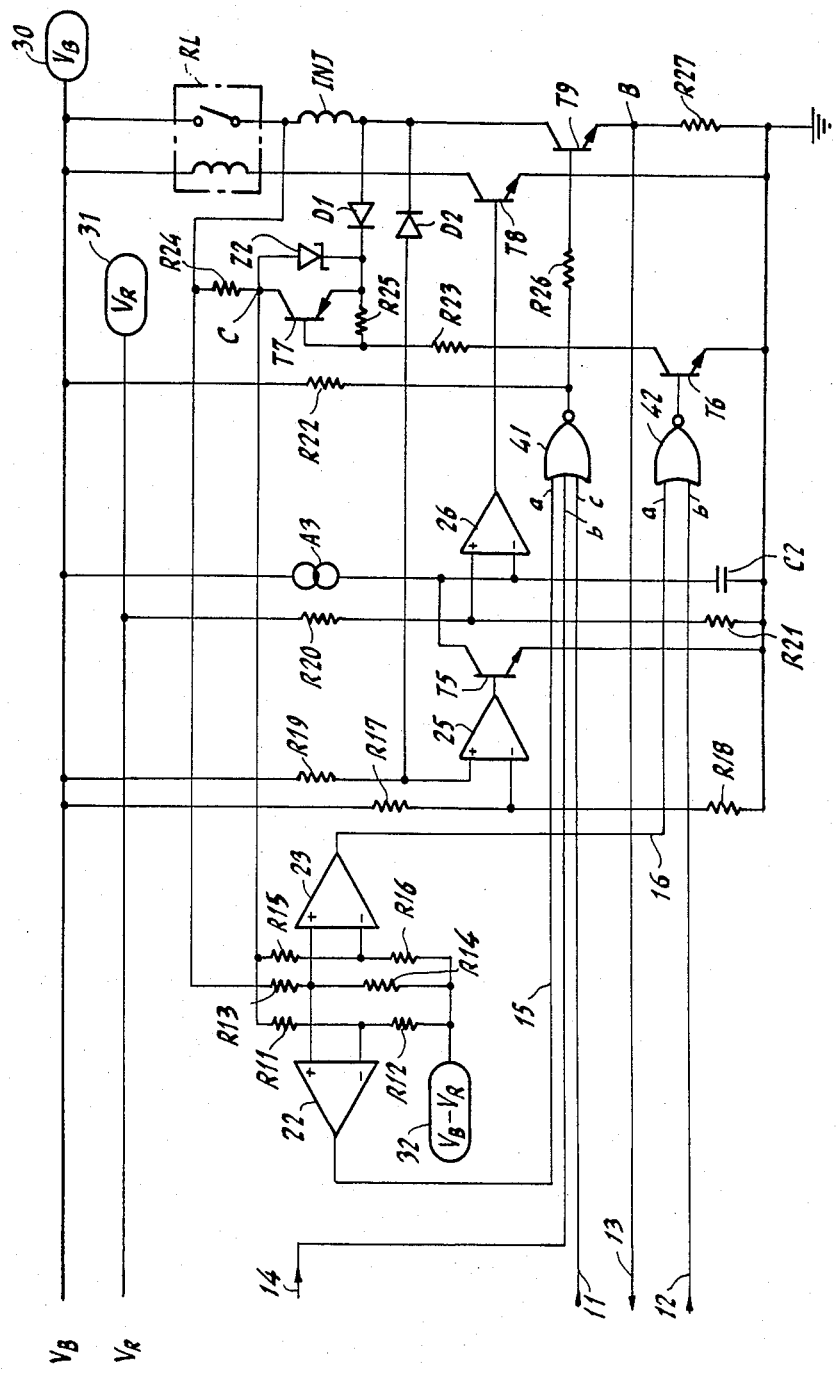

Referring to FIGS. 1a and 1b, there is shown a current control apparatus for electromagnetic valves according to the invention. For purposes of illustration, an electronic fuel injection valve of an automotive vehicle is illustrated. The valve-open control pulse is derived from a conventional fuel injection control circuit including a plurality of engine operating parameter sensors 1. Such parameters include intake manifold pressure, engine speed, engine coolant temperature and air-fuel ratio. The sensed parameter signals are applied to a microcomputer 2 which processes them to determine the duration of the control pulse. The control pulse is applied through an inverter INV to the reset terminal of a flip-flop FF whose Q output is coupled to an input terminal b of an OR gate 40. The output of the inverter is also coupled over a line 11 to an input terminal c of a NOR gate 41 and further coupled over a line 12 to an input terminal b of a NOR gate 42. The output of NOR gate 41 is connected by a resistor R26 to the base of a valve control switching transistor T9 whose emitter is connected to ground through a current-sensing resistor R27 and whose collector is connected to one terminal of the actuating coil INJ of the fuel injection electromagnetic valve. The other terminal of the actuating coil INJ is connected via the contacts of an over-current protection relay RL to a voltage source 30 having a voltage $V_B$ which is derived from a vehicle-mounted battery.

A voltage developed at junction B between the current-sensing resistor R27 and the emitter of transistor T9 represents the amount of energization current that flows in the coil INJ during transistor T9 is conducting. The voltage at junction B is coupled by a line 13 and voltage dividing resistors R6 and R7 to a constant voltage source 31 having a voltage $V_R$, the junction between R6 and R7 being connected to the noninverting input of a first comparator 21 for making a comparison with a variable reference voltage. This variable reference voltage is derived from a circuit comprising resistors R8 and R9 coupled between the voltage source $V_R$ and ground and a resistor R10 which is coupled at one end through the collector-emitter path of a reference switching transistor T4 to the voltage supply 30 at $V_B$, the base of transistor T4 being coupled to the output of the OR gate 40. The other end of resistor R10 is connected to a junction between resistors R8 and R9 and further connected to the inverting input of the first comparator 21.

When the Q output of flip-flop FF is low, the transistor T4 is turned on so that the reference voltage corresponds to the energization current having a value $I_P$ which is sufficient to cause the injection valve to open quickly in response to the time of occurrence of a control pulse. The first comparator 21 serves to detect when the energization current exceeds the variable reference value and generates a high level output to set the flip-flop FF. As will be described the variable reference switches to a lower level corresponding to a higher holding current value $I_{HH}$ when the flip-flop FF is in a set condition once the energization current exceeds the higher reference value $I_P$.

The output of the first comparator 21 is also connected via a line 14 to an input terminal b of the NOR gate 41 to turn off the coil switching transistor T9 when the energization current exceeds the variable reference $I_P$ or $I_D$.

According to the invention, the actuating coil INJ is in shunt with a first energy-absorbing circuit formed by a diode D1, a Zener diode Z2 and a resistor R24 and in shunt with a second energy-absorbing circuit formed by the resistor R24 and diode D1 which are shared in common with the first energy-absorbing circuit and a switching transistor T7 whose collector is coupled to a junction C between resistor R24 and the anode of Zener diode Z2. The transistor T7 is biased by a voltage developed across a resistor R25 which is connected between the emitter and base of transistor T7. The base of transistor T7 is connected by a resistor R23 to the collector of transistor T6 whose emitter is connected to ground.

When the transistor T9 is turned off in response to the reference $I_P$ being reached, a high counter EMF (electromotive force) is generated in the coil INJ, and the energization current continues in the same direction due to the known "flywheel" effect of the inductive nature of the actuating coil INJ and circulates through the first energy-absorbing circuit. Due to the fact that the high counter EMF sets the initial value of the transient condition to a high value, the circulating current reduces rapidly from the peak value $I_P$ to an intermediate current value $I_D$ which is higher than the higher holding current value $I_{HH}$. When the intermediate current value $I_D$ is reached, the second energy-absorbing circuit is switched into parallel connection with the coil INJ to allow the circulating current to pass therethrough. Since the counter EMF has reduced to a lower level, the initial value of the transient condition is set to a lower value and therefore the circulating current reduces at a lower rate.

A second comparator 22 is provided to turn on the transistor T9 when the current flowing through the second energy-absorbing circuit reduces to a lower holding value $I_{HL}$ which represents a minimum value necessary to hold the valve open. A third comparator 23 is provided to effect the switching from the first energy-absorbing circuit to the second energy-absorbing circuit.

The second comparator 22 has a noninverting input terminal coupled to a junction between resistors R11 and R12 which are in turn series-coupled between a voltage source 32 having a potential $V_B - V_R$ and the junction C, the inverting input terminal thereof being connected to a junction between resistors R13 and R14 which are in turn series-connected between source 32 and the voltage supply 30 through relay contacts RL. The second comparator 22 compares a low level output when the circulating current reduces below the lower holding value $I_{HL}$.

The output of the second comparator 22 is applied via a line 15 to an input terminal a of NOR gate 41, whereby NOR gate 41 switches to a high output level to turn on transistor T9 in response to the low level output of comparator 22 which repeatedly occurs in the presence of a fuel injection pulse.

The third comparator 23 has a noninverting input terminal coupled to a junction between resistors R15 and R16 and an inverting input coupled to the junction between resistors R13 and R14. The third comparator 23 provides a low level output when the circulating current reduces below the intermediate reference value $I_D$ (see FIG. 2).

The output of the third comparator 23 is applied via a line 16 to an input terminal a of NOR gate 42, whereby this NOR gate switches to a high output level to turn on a switching transistor T6 until the termination of the control pulse. Upon the turn-on of transistor T6, a voltage develops across resistor R25 that biases transistor T7 into conduction to switch the circulating current to the second energy-absorbing circuit.

Additionally included is a fail-safe feature which is provided by a first protection circuit. This protection circuit is to avoid undesirable circumstances which might occur when the actuating coil has been warmed by current due to continued operation. This circuit comprises a fourth comparator 24 and a timing circuit formed by a transistor T3, a capacitor C1 and a constant current source A2 which starts charging the capacitor C1 when transistor T3 is turned off in response to a fuel injection pulse. The capacitor C1 is in shunt with the collector-emitter path of a transistor T2 whose base is coupled to a junction between a constant current source A1 and the collector of transistor T1 whose emitter is grounded. The base of transistor T1 is biased by a voltage developed at a junction between a resistor R3 and a Zener diode Z1 which is coupled by a resistor R1 to voltage supply 30 and by a resistor R2 to ground. The output of the fourth comparator 24 is coupled to an input terminal a of OR gate 40 to turn off transistor T4 by applying a high voltage output thereto when the capacitor C1 voltage exceeds a reference voltage established by resistors R4 and R5.

The fail-safe feature further includes a second protection circuit which serves to detect a short-circuit condition of the actuating coil INJ and includes fifth and sixth comparators 25 and 26 and transistors T5 and T8. The transistor T8 is connected in series with the winding of relay RL to energize it when the actuating coil INJ is supplied with the normal current and de-energize it to cut off the coil current if it exceeds a predetermined rate value. The fifth comparator 25 has its noninverting input coupled by a diode D2 to the collector of solenoid switching transistor T9 for comparison with a reference voltage derived at a junction between voltage dividing resistors R17 and R18.

Figure 2:
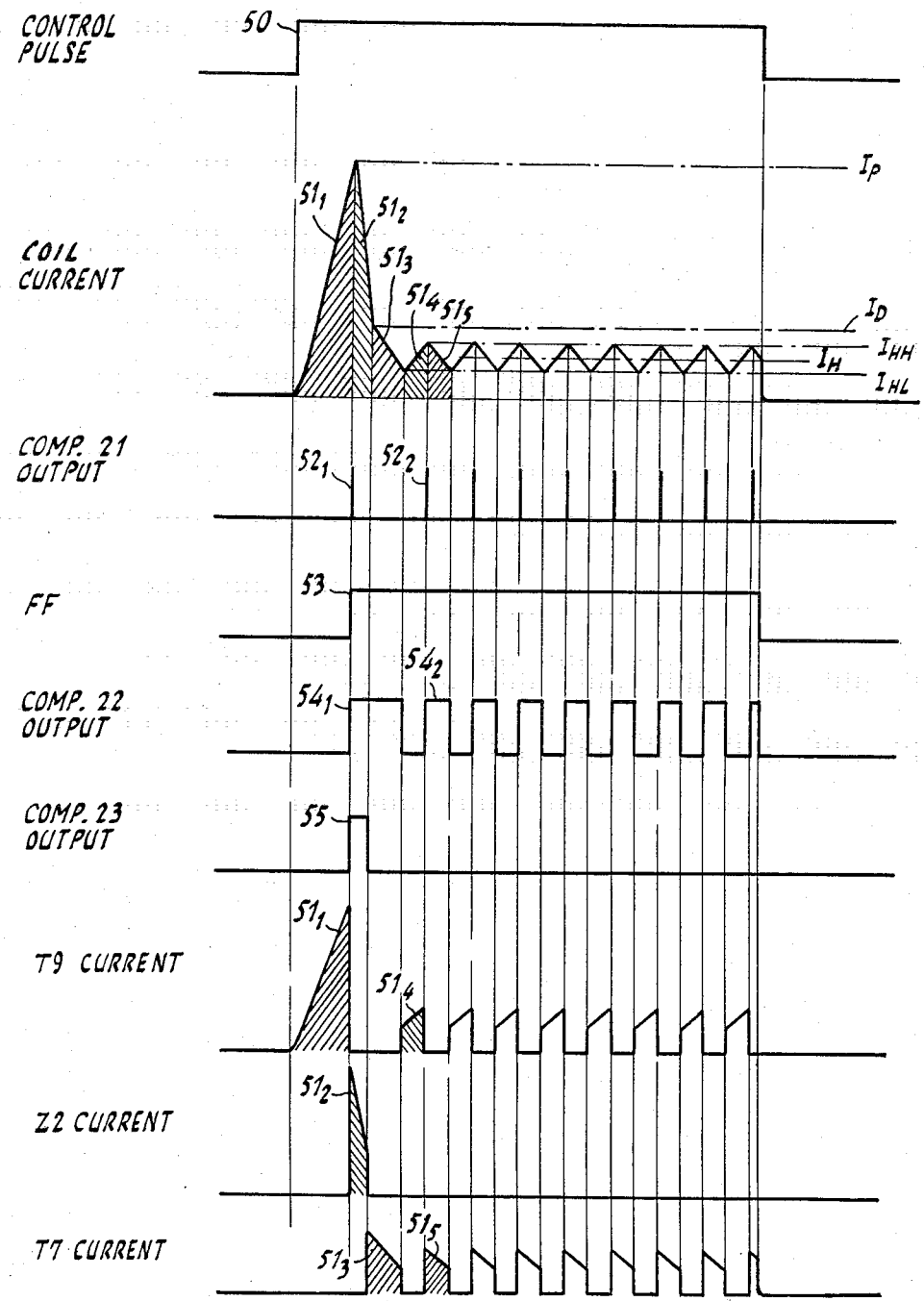
FIG. 2 is a timing diagram useful for describing the operation of the invention.

The normal operation of the valve control circuit of the invention be best understood with reference to FIG. 2.

In the absence of a valve control pulse, or fuel injection pulse 50, to be supplied from the microcomputer 2, the potential at a junction A in FIG. 1 is at high voltage level and therefore the input levels at the c terminal of NOR gate 41 and the b terminal of NOR gate 42 are also at high voltage level, causing transistors T6, T7 and T9 to turn off. Simultaneously, the flip-flop FF is in a reset condition, providing a low level output to the b input of NOR gate 41. Thus, the junctions B and C are at zero and $V_B$ potentials, respectively, which cause comparators 21, 22, 23 and 24 to generate low voltage outputs and cause transistor T4 to turn on to thereby switch the variable reference of the first comparator 21 to the higher level corresponding to $I_P$.

The fifth comparator 25 provides a high level output to the base of transistor T5 to turn it on. Capacitor C2 is short-circuited by the transistor T5, resulting in a high voltage output from the sixth comparator 26 that causes the transistor T8 to turn on, energizing the protection relay RL. Thus, the actuating coil INJ is in readiness to be energized in response to the turn-on of transistor T9.

In response to the leading edge transition of the valve control pulse 50, the potential at junction A reduces to zero voltage level. This satisfies the input conditions of NOR gate 41 to turn on transistor T9. This initiates a current $51_1$ that passes through actuating coil INJ and transistor T9. This current rises rapidly as a function of the coil's internal resistance plus the resistance of R27 and as a function of the coil's inductance to open the injection valve, causing an increase in the potential at the noninverting input of the first comparator 21. (More specifically, the current $51_1$ is approximately equal to $V_B[1-\exp\{-R_{inj}+R27)t/L_{inj}\}]/(R_{inj}+R27)$, where Rinj is the internal resistance of the actuating coil INJ, and Linj is the inductance of the actuating coil INJ.) When the initial energization current reaches the peak value $I_P$, the first comparator 21 produces a high level output $52_1$ which causes flip-flop FF to switch to a high Q output state as shown at 53, turning both transistors T4 and T9 off.

With the transistor T7 being in a turned-off state, the turn-off of transistor T9 induces a counter EMF in the actuating coil INJ that turns on Zener diode Z2 causing a circulating current $51_2$ to pass through the diode D1, Zener diode Z2, resistor R24 and actuating coil INJ. As a result of the relatively high initial counter EMF, the circulating coil current reduces rapidly toward the intermediate level $I_D$. Since this circulating current passes through the resistor R24, the voltage at the junction C becomes equal to voltage $V_B$ plus $I_P \times R24$ and switches the second and third comparators 22 and 23 into high output levels as shown at $54_1$ and 55, respectively. The second comparator 22 remains in the high output level $54_1$ during the time transistor T9 remains off, whereas the third comparator 23 switches to a low output level when the circulating current becomes equal to the intermediate current value $I_D$. Transistors T6 and T7 turn on in response to the low level output of comparator 23 to switch the circulating current path to the second energy-absorbing circuit, allowing a current $51_3$ to pass through the diode D1, transistor T7, resistor R24 and actuating coil INJ. Due to the relatively initial value of the transient condition as mentioned previously, the circulating current $51_3$ to reduces at a lower rate than the circulating current $51_2$. This serves to prevent the current from excessively reducing to such a low level that the electromagnetic valve may close, while ensuring rapid dissipation of the energy stored in the coil INJ.

The circulating current $51_3$ reduces until it reaches the lower holding current value $I_{HL}$, whereupon the second comparator 22 switches to a low output state, terminating the high voltage comparator output $54_1$. Transistor T9 is again turned on to reinitiate an energization current $51_4$ while allowing the potential at junction B to rise until the current $51_4$ becomes equal to the higher holding current value $I_{HH}$. Comparator 21 provides a high level output $52_2$ which turns off transistor T9, reinitiating a circulating current $51_5$. This reinitiated circulating current $51_5$ passes through transistor T7 since the latter remains conductive by the low level output of comparator 23. The turn-off of transistor T9 in response to comparator output $52_2$ increases the voltage at junction C again to cause the second comparator 22 to provide a high level output $54_2$.

Since the variable reference of the first comparator 21 remains switched to the higher holding current value $I_{HH}$ by the high level output 53 of flip-flop FF, the energization current never exceeds the higher holding current value $I_{HH}$ once the latter has been reached and thereafter fluctuates between it and the lower holding value $I_{HL}$ to keep the solenoid valve open with an average holding current $I_H$ until the termination of the control pulse 50. Upon the termination of the control pulse, the coil current reduces to zero level in a short time, allowing the injection valve to rapidly return to the closed position.

Since the energization current $51_2$ reduces rapidly in a short time, it is less likely that the electromagnetic valve encounters a situation in which the control pulse is terminated during the time prior to the holding mode.

The operation of the first protection circuit will be described. When the battery voltage $V_B$ is higher than a predetermined value, typically 10.5 volts, the Zener diode Z1 is in a conductive state, developing a voltage across resistor R1 that turns on transistor T1 and turns off transistor T2. Capacitor C1 will be charged with a current supplied from a constant current source A2 when the transistor T3 is turned off.

In the event that the initial energization currrent $51_1$ fails to reach the peak value $I_P$ within a predetermined period, typically two milliseconds, the capacitor C1 voltage will reach the reference voltage established at the junction between resistors R4 and R5. The comparator 24 responds to it by applying a high voltage output to the base of transistor T4 to turn it off, thereby forcibly reducing the variable reference for the first comparator 21 to the lower level corresponding to the higher holding current $I_{HH}$. Consequently, the control circuit is shifted to the solenoid valve hold mode. This serves as a measure to prevent a large trigger current (typically of the order of several amperes) from flowing indefinitely through the actuating coil if its internal resistance has increased due to Joule's heat accumulated therein and hence caused the current $51_1$ never to reach the threshold level $I_P$.

However, should the above-noted condition occur when the battery voltage $V_B$ is lower than a predetermined value, typically 10.5 volts, the trigger current would have a relatively large rise time and the control circuit would be switched to hold mode with the valve remain closed. This undesirable circumstance is avoided by the Zener diode Z1 which will be turned off when the voltage $V_B$ has reduced below 10.5 volts. The turn-off of Zener diode Z1 turns off transistor T1, causing transistor T2 to turn on to provide a short-circuit path across the capacitor C1 to prevent it from being charged upon the turn-off of transistor T3 in response to the leading edge of the control pulse 50.

The following is a description of the operation of the second protection circuit which detects short-circuit conditions in the actuating coil to protect it from over-current damages. Such short-circuit conditions may arise when transistor T9 is destroyed or the associated wire-harness is short-circuited. In a specific embodiment of the invention, a short-circuit condition is assumed to have occurred if the voltage at the collector of the valve switching transistor T9 has dwelled at one half the battery voltage $V_B$ or less for a period longer than 5 seconds (This period is determined by the maximum duration of the injection pulse 50). The second protection circuit detects such conditions and de-energizes the protection relay RL. Specifically, the comparator 25 responds to the voltage $V_B$ being reduced to one-half its rated value by generating a low voltage output which turns off transistor T5. This allows a constant current source A3 to charge the capacitor C2, developing a voltage thereacross to be sensed by the comparator 26. If such condition should last for the specified 5-second period, the output of comparator 26 switches to a low voltage level and transistor T8 turns off, thereby cutting off the circuit for the protection relay RL to cut off the current supplied to the actuating coil INJ. Should the voltage at the collector of transistor T9 return to the normal value, transistor T5 will be turned on to provide a low impedance circuit whereby the capacitor C2 is rapidly discharged and transistor T8 is turned on to re-energize the relay RL.

If power is removed from the valve control circuit for a brief period after the protection relay has been de-energized upon the occurrence of a short-circuit condition, the capacitor C2 will be discharged during this period and a chain of events just noted above will be triggered to energize the protection relay.

In a practical aspect of the invention, the following description is useful for determining the various threshold values employed in the valve control circuit which is preferably be fabricated on a hybrid integrated circuit chip using thick-film techniques to produce major resistor elements.

In a first step, the Q output of flip-flop FF is set equal to high voltage level and a current is supplied through resistor R27 from an external voltage source so that it develops a voltage corresponding to the holding current $I_{HH}$. The resistor R8 is then trimmed until the comparator 21 switches its binary output state. In a second step, with the output of flip-flop FF being at a low level and current $I_P$ being fed to resistor R27, the resistor R10 is adjusted until the comparator 21 changes its output state. In a third step, with the output of flip-flop FF being at a high level and a current $I_{HL}$ being fed to resistor R24, the resistor R12 is calibrated until the comparator 22 changes its output state. In a fourth and final step, with a current $I_D$ being fed to resistor R24, the resistor R16 is adjusted until the output of comparator 24 changes its binary state.

What is claimed is:

1. A method for controlling the operating current of an electromagnetic valve in response to a variable duration pulse, comprising the steps of:
   (a) coupling an energization voltage to an actuating coil of said electromagnetic valve in response to a leading edge of said pulse to initiate an energization current in said coil;
   (b) detecting when said energization current reaches a predetermined peak value;
   (c) decoupling said energization voltage from said coil to allow a circulating current to flow through a first path to decrease said circulating current at a higher rate;
   (d) detecting when said circulating current decreases to a medium current value;
   (e) switching said circulating current to a low resistance path to decrease said circulating current at a lower rate;
   (f) detecting when said circulating current reaches a lower holding current value necessary to hold said electromagnetic valve operated;
   (g) coupling said energization voltage to said coil to reinitiate said energization current;
   (h) detecting when said energization current reaches a higher holding current value lower than said medium current value;
   (i) decoupling said energization voltage from said coil to reinitiate said circulating current; and
   (j) repeating the steps (f) to (i) until the occurrence of a trailing edge of said pulse.

2. A method as claimed in claim 1, further comprising the steps of:
   (k) detecting when said energization current fails to reach said peak current value within a predetermined period running from the time of occurrence of said leading edge of said pulse; and
   (l) decoupling said energization voltage from said coil.

3. A method as claimed in claim 2, further comprising detecting when said energization voltage is lower than a predetermined value and disabling the step (k).

4. A method as claimed in claim 1, further comprising the steps of:
   detecting a short-circuit condition of said electromagnetic valve;
   decoupling said energization voltage from said electromagnetic valve.

5. An apparatus for controlling the operating current of an electromagnetic valve in response to a variable duration pulse, comprising:

a switching device connected in series with an actuating coil of said electromagnetic valve for coupling an energization voltage thereto when rendered conductive to generate an energization current and decoupling said voltage therefrom when rendered nonconductive to generate a circulating current;

first means for successively generating a first switching signal when said energization current exceeds a peak current value and a second switching signal when said circulating current drops to a medium current value, and alternately generating a third switching signal when said circulating current drops to a lower holding current value and a fourth switching signal when said energization current rises to a higher holding current value lower than said medium current value;

second means for rendering said switching device conductive in response to a leading edge of said pulse and said third switching signal and rendering said switching device nonconductive in response to said first and fourth switching signals and a trailing edge of said pulse;

first energy absorbing circuit means connected in parallel with said coil for conducting said circulating current which is generated in response to said switching device being rendered nonconductive; and second energy absorbing circuit means connected in parallel with said coil for conducting said circulating current in response to said second switching signal.

6. An apparatus as claimed in claim 5, wherein said first energy absorbing circuit means includes a breakdown diode for conducting said circulating current when a voltage developed in said actuating coil exceeds a predetermined value.

7. An apparatus as claimed in claim 5, wherein said third means comprises:

a comparator having a first input terminal connected to be responsive to a voltage signal representative of said energization current and a second input terminal connected to be responsive to a variable reference voltage to generate an output signal when said voltage signal exceeds said variable reference voltage; and means for setting said variable reference voltage to a high voltage level corresponding to said peak current value and changing said variable reference voltage to a low voltage level corresponding to said high holding current value in response to said output signal, whereby said output signal generated when said variable reference is set to said high voltage level corresponds to said first switching signal and said output signal generated when said variable reference is changed to said low voltage level corresponds to said fourth switching signal.

8. An apparatus as claimed in claim 7, further comprising protection means for detecting when said energization current fails to reach said peak value within a predetermined period which runs from the time of occurrence of the leading edge of said control pulse and causing said variable reference voltage to change from said high voltage level to said low voltage level.

9. An apparatus as claimed in claim 7, further comprising means for detecting when the voltage applied to said actuating coil reduces below a predetermined level and disabling said protecting means.

10. An apparatus as claimed in claim 5, further comprising second protection means for detecting when said energization current dwells at a predetermined current value for a predetermined period running from the time of occurrence of the leading edge of said pulse and de-energizing said actuating coil.

* * * * *